(12) United States Patent
Voris et al.

(10) Patent No.: US 9,656,428 B2
(45) Date of Patent: May 23, 2017

(54) THREE DIMENSIONAL (3D) PRINTED OBJECTS WITH EMBEDDED IDENTIFICATION (ID) ELEMENTS

(71) Applicant: DISNEY ENTERPRISES, INC., Burbank, CA (US)

(72) Inventors: Jeffrey Voris, Pasadena, CA (US); Benjamin Foster Christen, Los Angeles, CA (US); Jorge Alted, Altadena, CA (US); David W. Crawford, Long Beach, CA (US)

(73) Assignee: Disney Enterprises, Inc., Burbank, CA (US)

(*) Notice: Subject to any disclaimer, the term of this patent is extended or adjusted under 35 U.S.C. 154(b) by 333 days.

(21) Appl. No.: 14/480,717

(22) Filed: Sep. 9, 2014

(65) Prior Publication Data
US 2016/0067927 A1    Mar. 10, 2016

(51) Int. Cl.
| | |
|---|---|
| *G06F 19/00* | (2011.01) |
| *B29C 67/00* | (2017.01) |
| *B33Y 50/02* | (2015.01) |
| *G05B 15/02* | (2006.01) |

(52) U.S. Cl.
CPC .......... *B29C 67/0088* (2013.01); *B33Y 50/02* (2014.12); *G05B 15/02* (2013.01); *G05B 2219/49023* (2013.01); *G05B 2219/49246* (2013.01)

(58) Field of Classification Search
CPC ............................. G06F 17/50; B29C 67/0092
See application file for complete search history.

(56) References Cited

U.S. PATENT DOCUMENTS

| | | | |
|---|---|---|---|
| 9,400,910 B2* | 7/2016 | Kumar ................. | G06K 7/1426 |
| 2012/0183701 A1* | 7/2012 | Pilz ....................... | B22F 3/1055 |
| | | | 427/504 |
| 2014/0058959 A1* | 2/2014 | Isbjornssund ........... | G06F 21/10 |
| | | | 705/310 |
| 2015/0095213 A1* | 4/2015 | Paintin ................ | B29C 67/0088 |
| | | | 705/39 |
| 2015/0145158 A1* | 5/2015 | Levine ................ | B29C 67/0085 |
| | | | 264/40.1 |
| 2015/0248678 A1* | 9/2015 | Wee .................... | G06Q 30/0185 |
| | | | 705/318 |
| 2015/0352885 A1* | 12/2015 | Wee ..................... | B42D 25/305 |
| | | | 235/492 |

\* cited by examiner

*Primary Examiner* — Ronald Hartman, Jr.
(74) *Attorney, Agent, or Firm* — Marsh Fischmann & Breyfogle LLP; Kent A. Lembke

(57) ABSTRACT

A method for operating a three dimensional (3D) printer to limit unauthorized copying and provide authentication of 3D objects printed from authorized models fabricated on 3D printers. The method includes providing a digital file defining a 3D model of an object to the 3D printer. The 3D model includes a model of an identification (ID) element. The method includes processing the digital file to define print layers of the 3D model, and a number of the print layers include layers of the model of the ID element. The method involves operating the 3D printer to print the layers to form a 3D object with an integrally formed ID element. The ID element is embedded within object elements of the 3D object. The integrally formed ID element may be a radio frequency ID (RFID) tag providing identification data when read by an RFID reader scanning the 3D object.

19 Claims, 6 Drawing Sheets

THREE DIMENSIONAL (3D) PRINTED OBJECTS WITH EMBEDDED IDENTIFICATION (ID) ELEMENTS

BACKGROUND

1. Field of the Description

The present invention relates, in general, to fabrication of three dimensional (3D) objects, and, more particularly, to a method of using a 3D printer (and corresponding 3D objects) to print 3D objects that can be used to limit unpermitted or non-licensed copying.

2. Relevant Background 3D printing is an additive technology in which objects (or "printed 3D objects") are created from a digital file. The digital file may be generated from software such as a computer aided design (CAD) program or another 3D modeling program or with a 3D scanner to copy an existing object that provides input to a 3D modeling program. To prepare the digital file for printing, software, provided on a printer-interfacing computer or running on the 3D printer itself, slices the 3D model into hundreds to thousands of horizontal layers. Typically, only the outer wall or "shell" is printed to be solid such that a shell thickness may be defined as part of modifying the 3D model for use in printing, and, during printing, the shell is printed as a solid element while the interior portions of the 3D object are printed in a honeycomb or other infill design (e.g., to reduce the amount of material that has to be printed to provide the printed 3D object).

When the prepared digital file of the 3D object is uploaded into the 3D printer, the 3D printer creates the object layer-by-layer. The 3D printer reads every slice (or 2D image) from the 3D model and proceeds to create the 3D object by laying down (or "printing") successive layers of material until the entire object is formed. Each of these layers can be seen as a thinly sliced horizontal cross section of the eventually completed or printed 3D object.

One of the more common 3D printer technologies uses fused deposition modeling (FDM) or, more generally, fused filament fabrication (FFF). FDM printers work by using a plastic filament (e.g., acrylonitrile butadiene styrene (ABS) or polylactic acid (PLA) provided as strands of filament that is 1 to 3 millimeters in diameter) that is unwound from a coil or spool mounted onto the printer housing. The plastic filament is used to supply material to a print head with an extrusion nozzle, e.g., a gear pulls the filament off the spool and into the extrusion nozzle. The extrusion nozzle is adapted to turn its flow on and off. The extrusion nozzle (or an upstream portion of the print head) is heated to melt the plastic filament as it is passed into, or through, the extrusion nozzle so that it liquefies. The pointed extrusion nozzle deposits the liquefied material in ultra fine lines (e.g., in lines that are about 0.1 millimeters across).

The extrusion head and its outlet are moved in both horizontal and vertical directions to complete or print each layer of the 3D model by a numerically controlled mechanism that is operated or controlled by control software running on the 3D printer (e.g., a computer-aided manufacturing (CAM) software package adapted for use with the 3D printer). The extruded melted or liquefied material quickly solidifies to form a layer (and to seal together layers of the 3D object), and the extrusion nozzle is then moved vertically prior to starting printing of the next layer. This process is repeated until all layers of the 3D object have been printed. The print surface, which may be called a print bed or build plate, is often heated also to avoid having the bottom layer of plastic of the 3D object delaminating during printing.

The increased availability and widespread use of 3D printers has generated a number of new problems. For example, 3D printed objects are very easy to reproduce or copy. Copies of a 3D object may be produced by transferring or sharing the digital file that was used to produce the first of a particular 3D object. In other cases, a 3D object may be scanned to produce a new digital file that can be used to control a 3D printer to reproduce a 3D object that exactly, or nearly so, copies all of the external features of the scanned 3D object. As a result, it presently is a rather trivial task for one in the possession of a 3D printer to produce unlimited identical copies of a printed object (or printable model) either by obtaining the 3D model or creating their own.

As can be seen, 3D printer and related technologies including scanners have made it very difficult to prevent copying of many products or objects, and it is difficult to impossible presently to distinguish between an original 3D printed object and a later printed copy. Such accurate copying can be particularly troubling in the field of collectables. A collectable manufactured for sale to collectors as collectables is often more valued by their owners when they have a proven authenticity as coming from a particular source or are part of a limited run. For example, a collector may seek out a figurine of a character from a live or animated film when they can readily verify that the figurine (or "3D object") is one of a limited run produced by a particular company (e.g., the figurine is Figurine No. 45 of a run of 1000) after which the "mold" is not used to produce more figurines. If these figurines can be easily copied with a 3D printer, though, the uniqueness and desirability of these figurines may be significantly reduced.

Hence, there remains a need for a technique for preventing unpermitted or unlicensed copying of 3D objects. Such a copying-prevention technique preferably would be useful to block or limit the use of 3D printer technologies to print a copy of a particular 3D object, which will allow people to continue to be assured they are acquiring an original print of a model and may also allow collectors to validate that their product (or 3D object) is authentic.

SUMMARY

Briefly, the 3D print method described herein includes creating a digital file that defines a 3D object model of an object to be printed by a 3D printer. The digital file defines not only the outer shell of the 3D object but also defines a unique identifier or identification (ID) element to be printed in the inner volume (within the outer shell) of the 3D object in one or more layers. The ID element may be, for example, a passive radio frequency identification (RFID) tag that is embedded within the 3D object (or its body or one of the object elements) such that it is not visible on an exterior surface so as to limit copying of the ID element with scanning techniques.

Once a 3D object is printed, a sensor (such as an RFID reader) can be used to read or detect the presence of the ID element within a 3D object printed using this digital file to identify the 3D object such as to verify its authenticity or that it is one of a limited run (e.g., the ID element may provide data indicating a unique serial or part number). Records of the printing of the 3D objects with ID elements may be retained such as in a central database so as to track printing of each ID element (and its associated 3D object). The central database can then be accessed by customers (e.g., collectors and others) to verify authenticity of a 3D object by scanning or processing an ID element (or the information it provides). The central tracking database may also allow the customer or collector to perform other tasks such as obtaining permission to print a collectable using their 3D printer (e.g., a digital file with a unique ID element definition may be transmitted to or accessed by the collector from a server on a communications network such as the Internet), and the central tracking database may increase the count of such objects that have been printed (or for which permission to print has been granted). Further, the customer or collector may be able to determine when a limited run of a 3D object is completed and to find and/or contact the customers or collectors that printed a particular 3D object (e.g., one of the 3D objects of the completed limited run).

More particularly, a method is described for operating a three dimensional (3D) printer to limit unauthorized copying of printed items. The method includes providing a digital file defining a 3D model of an object to the 3D printer, and the 3D model includes a model of an identification (ID) element (or a definition of an ID element to print). The method continues with processing (e.g., with the 3D printer's control program(s)) the digital file to define a plurality of print layers of the 3D model, and a number of the print layers include layers of the model of the ID element. The method then involves operating the 3D printer to sequentially print the print layers to form a 3D object with an integrally formed ID element.

In some implementations of the method, the integrally formed ID element is embedded within one or more of the object elements of the 3D object. In such cases, the integrally formed ID element may be spaced apart a distance from an outer shell of the object elements in which it is embedded, which limits susceptibility of the ID element to copying via scanning of external surfaces of the 3D object.

In some cases, the integrally formed ID element is or includes a radio frequency ID (RFID) tag (e.g., a passive RFID tag configured to provide identification data when read by an RFID scanner or reader). In other cases, the operating of the 3D printer to sequentially print the print layers involves printing portions of the 3D object with a first print material and the integrally formed ID element with a second print material that differs from the first print material with regard to at least one physical characteristic. For example, the physical characteristic can be density, and the integrally formed ID element can than have a greater density than the portions of the 3D object printed with the first print material. In another example, the physical characteristic is electrical conductivity, and the integrally formed ID element can be more electrically conductive than the portions of the 3D object printed with the first print material.

According to another aspect of the present description, a printed 3D object is described that is adapted to limit unauthorized copying such as by use of a 3D scanner with a 3D printer. The printed 3D object includes an outer shell (or outer sidewalks) or skin) formed of a plurality of print layers each formed using a first print material. The printed 3D object also includes an interior portion providing infill of a void space within the outer shell (e.g., a honeycomb pattern). Significantly, the printed 3D object also includes an ID element integrally formed with the interior portion or infill (e.g., set apart a distance from the shell or outer sidewalks).

In some cases, the integrally formed ID element is a radio frequency ID (RFID) tag such as a passive RFID tag configured to transmit identification data when scanned or read by an RFID reader. In other cases, the ID element is an active RFID tag or similar device (i.e., the description may discuss passive RFID tags in more detail, but it will be understood that in some cases it may be desirable to print an active RFID tag to provide the ID element). In other cases, the integrally formed ID element includes a plurality of print layers formed of a second print material that differs from the first print material with regard to at least one physical characteristic. In such cases, the physical characteristic can be density such that the integrally formed ID element has a greater density than the portions of the 3D object printed with the first print material. In still other cases, the physical characteristic can be electrical conductivity, and the integrally formed ID element may be more electrically conductive than the portions of the 3D object printed with the first print material.

According to another aspect of the present description, a method is taught for validating authenticity of printed 3D objects. The method includes receiving a validation query, from a user device (e.g. a remote computing device linked over a digital communications network with a database server), and the query includes ID data for a printed 3D object. The ID data can be a set of data or information gathered by an ID sensor sensing or scanning an ID element of the printed 3D object. The method continues with searching ID records of a database for a match to the ID data, with the ID records including unique identifiers for a plurality of objects previously authorized for fabrication with 3D printing. The method also includes, when the ID data is matched in the searching step to one of the ID records, generating a response to the validation query that includes a validation of the printed 3D object as an authentic printed object.

In some implementations of the method, the ID element is a passive RFID tag on or embedded in the printed 3D object, and the ID sensor is an RFID scanner (or reader). Then, the ID data may be a serial number or code corresponding with one of the unique identifiers that is transmitted from the passive RFID tag to the RFID scanner. In other implementations, the ID element is (or includes) a 3D item formed integrally with the printed 3D object, and the 3D item may be formed of a first material with a density or electrical conductivity greater than a second material used to print other portions of the printed 3D object.

The method may further include receiving a print request from an additional user device to print an additional 3D object. Then, the method may involve responding to the print request by inserting a new ID record in the database with an additional one of the unique identifiers. Further, then, the method may include transmitting a print authorization to the additional user device including the additional one of the unique identifiers for use in defining an ID element to include in or on the additional 3D object.

DETAILED DESCRIPTION

Figure 1:
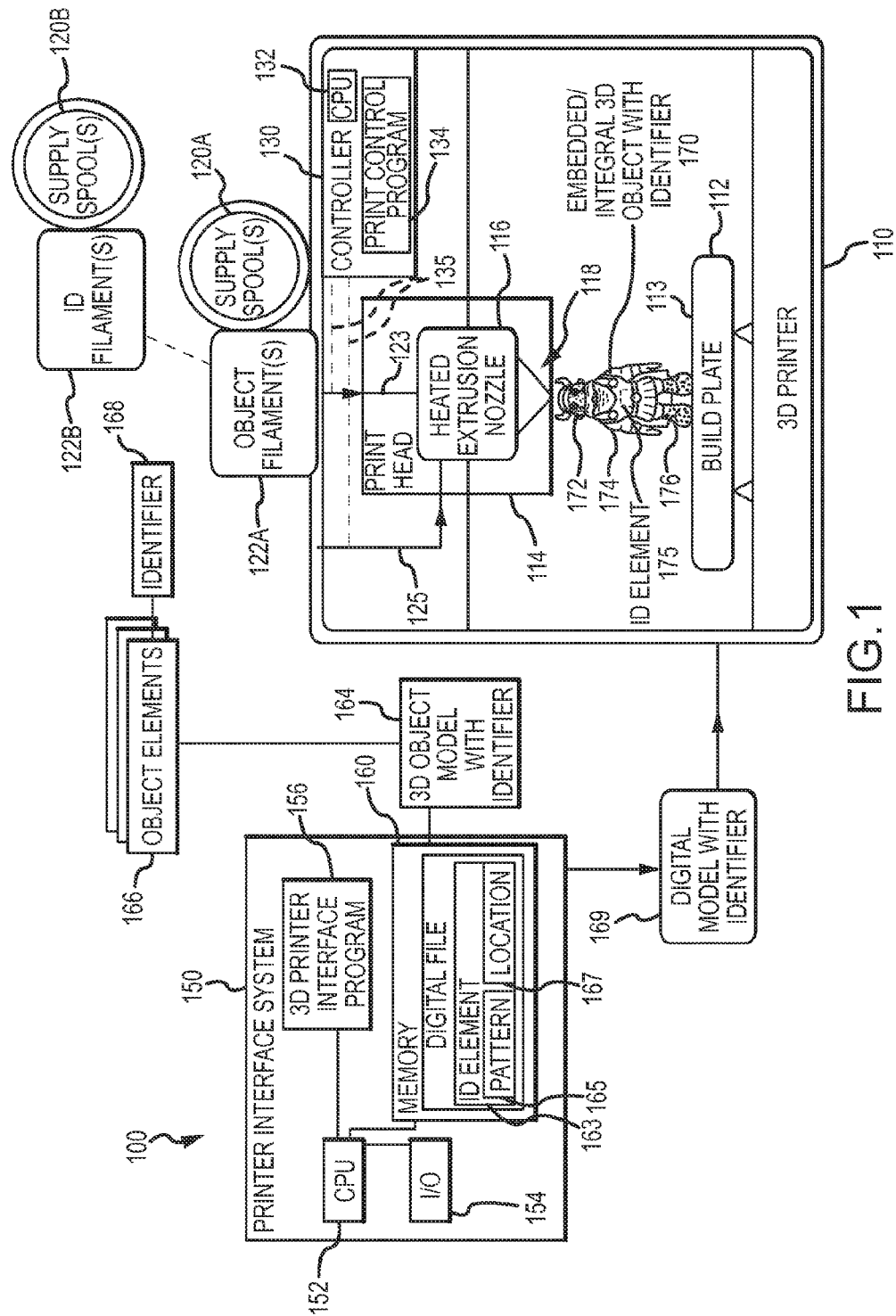
FIG. 1 is a functional block diagram of a 3D printer system during printing operations to provide a 3D object with an embedded or integral identifier that can be sensed or read with an external sensor or reader.

The inventors recognized that 3D printers and related technologies such as scanners used to create digital models of 3D objects for 3D printers make it difficult to control or block copying of nearly any printable model. With this problem in mind, the inventors determined that it would be useful to have a unique identifier or ID element in each physical instance of a printed 3D object that could not easily be copied (such as with a 3D scanner scanning external surfaces of the printed 3D object) but that would also remain a part of the original digital model.

One solution involves using a 3D printer to print a unique identifier or an ID element directly onto or into a 3D printed object. Printers are presently capable of printing objects in various materials using multiple print heads, and it is expected that these capabilities will improve over the coming years so as to make it even more practical to include an ID element, such as an RFID tag, on or, more typically, within a printed 3D object using a 3D printer. This solution (3D print method and resulting printed 3D objects) uses a digital model that is used to control a 3D printer, and the digital model incorporates a unique identifier/ID element directly within the digital data or digital file. The 3D printer uses this digital file to print a 3D object that includes the identifier or ID element. The ID element may be printed out of one or more materials (e.g., conductive, higher density than other material used for printing, or the like) and, typically, in according to a particular pattern (e.g., a passive RFID tag, a 3D ID with a particular shape, size, and/or location within the 3D object or its components/elements that identifies an object, or the like), which allows the ID element to be sensed and its "data" processed to verify the authenticity of the 3D object in which it is embedded (or on).

The print method allows any 3D printed item to have a unique identifier that can be sensed by external readers. The sensor collected data can then be used to certify the identifier and, therefore, the 3D printed object by accessing an external database in order to verify the 3D printed object is an "original" or as having been printed directly from a certified digital file instead of being created from an unlicensed copy or other unpermitted techniques. Having an RFID tag or other unique identifier ("ID element") printed directly into the 3D object also may benefit the manufacturing, inventorying, and selling of the 3D object since the 3D object can be easily tracked with external sensors/readers throughout its lifecycle.

There are numerous ways to create or provide an ID element within a printed 3D object. For example, the ID element may take the form of a passive RFID tag embedded in the digital model defined by the digital file used as input to the 3D printer. Each RFID tag can be configured differently such that when read by an external RFID reader ("sensor") it provides a unique identifier (or unique set of identifying data) for the 3D object. In another example, the ID element may be defined to be a 3D component with a unique pattern (such as shape and size and, optionally, location within the printed 3D object or its object elements such as within a torso, leg, arm, or head of a humanlike figurine). This ID element may be provided within a 3D model such that when a 3D object is printed an ID element is formed of a different material than other portions of the printed 3D object. In some implementations, the ID element is printed using a material with a different density than the material used for the outer shell and is printed in the interior volume defined by the outer shell (e.g., within or adjacent to the honeycomb portion of the 3D object). Then, an X-ray or similar sensor can "read" or sense the ID element, and this read or sensed data may be used to verify the identity or authenticity of the printed 3D object.

This description teaches: (1) incorporating a unique identifier into a digital file that defines a 3D object model; (2) using the digital file to provide a digital model for controlling a 3D printer to print a 3D object with an integral ID element; and (3) validating the ID element (and, therefore, the 3D object in which it is integrally formed) through the use of an external sensor or reader system and accessing a database of records associated with a plurality of ID elements using the data read/sensed by the external sensor or reader system.

In the past, others have tried to add identifiers to products after printing or manufacturing was completed such as by applying a hologram or other difficult-to-replicate identifier to an external surface of a product or by providing additional packaging that may include an identifier such as a barcode. The printing and validation techniques discussed herein eliminate such additional steps in the manufacturing process by incorporating the unique identifier while the 3D object is being built or printed. Further, since the ID element or unique identifier is embedded in or integrally formed with the printed 3D object, it would be nearly impossible to remove or replace it such that the ID element can be relied upon for use in validating the 3D object or product as being original/authenticate and not merely an unlicensed copy.

FIG. 1 illustrates a 3D print system 100 configured to allow an operator to print 3D objects having an embedded or integrally-formed identifier (or "ID element") to allow the 3D object to have its identity verified or its authenticity or originality validated (e.g., the 3D object is not an unauthorized copy formed by scanning and 3D printing or the like). As shown, the system 100 includes a 3D printer 110 and a printer interface system 150. The printer interface system 150 may be a desktop computer, a workstation, a laptop or pad computer, or other computer device operable by a user of the 3D printer 110 to select and transmit a digital model with a defined identifier 169 to the 3D printer 110 for use in printing a 3D object 170 with an embedded/integral ID element 175. To this end, the printer interface system 150 includes a processor or central processing unit (CPU) 152 that operates or manages input and output (I/O) devices 154 such as a monitor, a touchscreen, a mouse, a keyboard, speakers, voice recognition devices, and the like that allow an operator or user of the system 150 to provide user input (e.g., to select to include an identifier 168).

Particularly, the printer interface system 150 may include memory devices or data storage components (e.g., non-transitory computer readable medium) 160 (or have access to such memory devices) that are managed by the processor 152 to store one or more digital files 162 that are used to print a 3D object 170. Each digital file 162 may include a definition of an ID element 163 including its pattern 165

(size, shape, and so on) and it location 167 within one or more of the object elements 166 making up the 3D object model 164. Also, the system 150 may use the CPU 152 to execute code or software (in computer readable medium such as RAM, ROM, or the like on the system 150) in the form of a 3D printer interface program 156. The interface program 156 may be downloaded onto the system 150 to allow an operator to interact with the 3D printer 110 and its print controller 130, and the 3D printer 110 may provide this software/program 156 upon a first link of the system 150 and the 3D printer 110 or the software/program 156 may be downloaded separately (e.g., by inserting a CD into the system 150, by accessing a web site associated with the 3D printer 110, or the like).

In practice, the 3D printer interface program 156 may be adapted to cause a series of interface screens to be presented by the system 150 and the I/O devices 154 to a user. The user may select a 3D object for printing by first generating a 3D model 164 of a 3D object, and this definition may also include setting a thickness for an outer shell of object 170 and a structural infill (e.g., one or more honeycomb patterns). Significantly, the 3D object model 164 may include a plurality of object elements or portions 166 (e.g., legs, a body/torso, arms, a head, and so on when the object is a humanlike form or wheels, a body, doors, and so on if the object is an automobile, and the like). A unique identifier 168 may be selected by the user or assigned to the object by the 3D printer interface program, and unique identifier 168 may be positioned or located (with its location 167) by the interface program 156 or by a user of such program 156 within one or more of the object elements 166. In some embodiments, the pattern 165 itself provides unique identification data such as its shape or size or a component that can be read to obtain a unique identification number/code. In other cases, though, the pattern 165 of the ID element 163 is combined or processed with the location 167 of the ID element 163 in the 3D object model 164 is used to provide a verifiable unique identity for an object 170 printed according to the digital file 162.

During operations, the printer interface system 150 is operable to communicate (wirelessly or in a wired manner) with the 3D printer 110 including transmitting a digital model 169 with identifier to the 3D printer 110 (or send the digital file 162 to the 3D printer) for use by the print control program 134 to print a 3D object 170 with embedded/integral ID element 175 (in other cases, the print control program 134 accesses the digital file 162 in the memory 160, as needed for printing, rather than transmitting the model 169 to the 3D printer).

The 3D printer 110 includes a build plate or print bed 112 with an upper or exposed surface 113 upon which melted plastic or other material is printed from a print head(s) 114 to form a 3D object 170 with embedded/integral ID element 175. This can be seen in FIG. 1 with the 3D object 170 having differing elements or portions 172, 174, 176, and each may be printed using one or more object filaments 122A. To this end, the 3D printer 110 includes a print head 114 with a heated extrusion nozzle 116 with a pointed tip/outlet 118 from which liquid plastic is ejected or extruded to build up the object 170 layer-by-layer. In some cases, the heated extrusion nozzle 116 may include a heater or heat coil about a tube while in other cases a mixing chamber is provided immediately upstream of the tip/outlet 118. Note, also, that only one print head 114 is shown in 3D printer 110 and supply spools 120A, 120B are switched out to change print materials, but other embodiments of the 3D printer 110 may use multiple print heads 110 with each being fed a different print material via a dedicated supply spool 120A or 120B.

Further, the 3D printer 110 includes a print material supply in the form of supply spool(s) 120A upon which is wrapped or wound a length of plastic (or other material) 122A for use in printing the object elements 172, 174, and 176 (its shell and interior portions that may be honeycombed) and also supply spool(s) 120B upon which is wrapped or wound a length of a different plastic or other material 122B. Particularly, the material(s) or ID filament(s) 122B may be a plastic or other material that has a different density than the plastic 122A. In other cases, the plastic or materials 122B are chosen to be useful in printing a passive RFID tag to provide ID element 175 while in other cases the materials 122B are chosen that make the ID element 175 electrically conductive. In some cases, the filament 122A may take the form of ABS, PLA, or other plastic useful in 3D printing while the filament/material 122B will differ in at least one physical characteristic to facilitate later sensing or reading of the ID element 175 even though it is embedded within an interior portion of one or more of the object elements 172, 174, or 176 (e.g., is covered by or spaced apart from the shell in an interior space defined by the shell of the printed 3D object 170).

The 3D printer 110 includes a controller 130 for interfacing with the printer interface system 150 so as to print a 3D object 170, with embedded/integral ID element 175, based on the digital file 162. The controller 130 includes a processor 132 executing or running software/code in the form of a print control program 134 (e.g., code in computer readable media accessible by the CPU 132). The print control program 134 is configured to selectively cause the object filament(s) 122A or ID filament/materials 122B to be drawn 123 (e.g., with gearing or the like) from the spool 120A or spool 120B into the head 114 during the printing of each layer of the digital model 169.

The print control program 134 recognizes the ID element definition 163 (including pattern 165 and location 167) in the 3D object model 164 and uses this recognized information to select which print material spools/supplies 120A, 120B to use at each print location of the print head 114 relative to the build plate surface 113. The print control program 134 also operates to move the print head 114 within a layer and to a new layer (e.g., new vertical height) to print the 3D object 170 including the ID element 175 (e.g., to provide 3D printing, layer-by-layer as is known by those skilled in the art of 3D printing). In each layer of the 3D object 170, the print material may be one, two, three, or more plastics or materials as defined by the digital file 162. In this manner, an 1D element 175 is printed or formed integrally with the object elements 172, 174, 176 of the 3D object 170, and, as illustrated, the ID element 175 may be positioned within or embedded inside the object 170 (e.g., enclosed within the outer shell of the object 170).

Figure 2:
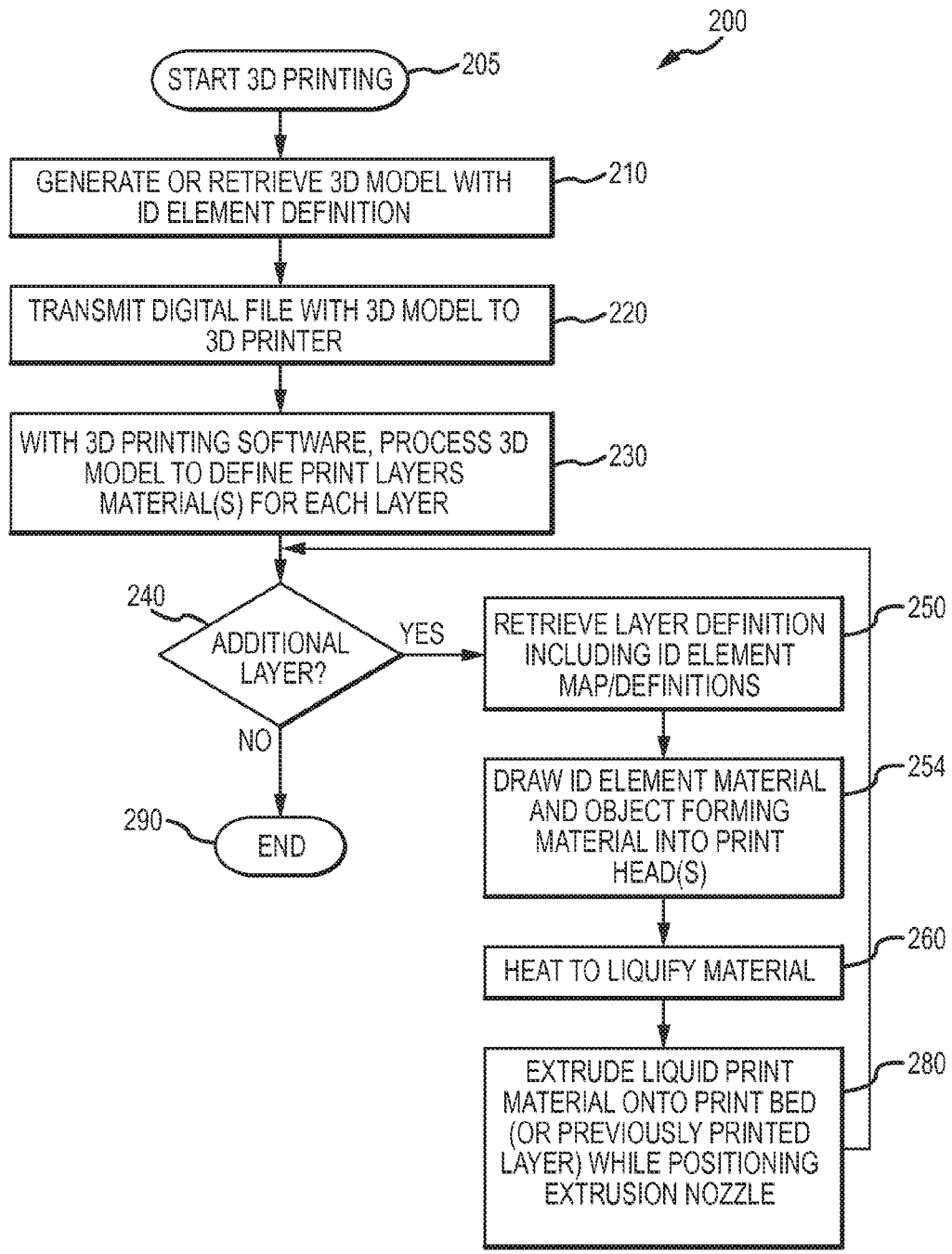
FIG. 2 is a flow diagram for a method of fabricating or printing a 3D object with an integrally formed (and typically embedded) unique identifier using a filament-based 3D printer or other 3D printer such as with use of the system of FIG. 1.

FIG. 2 illustrates a 3D printing method 200 that may be performed according to the present description such as by operation of the system 100 of FIG. 1. The method 200 starts at 205 such as with communicatively linking a printer interface system/computer with a 3D printer, with loading two or more print materials onto feed spools or other material supply devices (e.g., material for use in printing the 3D object elements and also for printing the ID element), and with providing 3D printer-to-user device interface software on a user's printer interface system/computer. In some cases, the 3D printer also has to be allowed time to warm up including heating an extrusion nozzle and/or ink-and-plastic mixing chamber to a temperature within a useful plastic liquefying/melting range.

The method 200 continues at 210 with generating a 3D model of an object or retrieving/selecting a previously generated 3D model. The 3D model includes a mapping or positioning of a unique identifier or ID element within the 3D model such as in an interior (inside and spaced apart from the outer shell) portion of one of the object elements, and the ID element typically is a 3D object itself (such as a printable RFID tag) that will be printed in one or, more commonly, many layers during the printing of the 3D object (e.g., the ID element is sliced into a plurality of print layers as is the 3D object being modeled).

The method 200 continues at 220 with transmitting the digital file with the 3D model to a 3D printer configured for printing ID elements (e.g., for printing using at least two materials to provide the ID element with a different density, with higher electrical conductivity, to print an RFID tag, and the like) as taught herein (or the controller of the 3D printer may access a memory device storing the digital file as needed in step 220 and during printing with such transmittal). In step 230, the method 200 continues with the 3D printer control or printing software functioning to process the 3D model of the object that includes an ID element or identifier. This processing includes defining print layers or thin slices of the 3D model of the object for use in printing a 3D object.

In step 230, the 3D printing software identifies or recognizes different materials, which may include one, two, or more materials in each layer and may include assigning a first material to object elements including the shell portion of each layer and a second (and third or more) material to an ID element in the layers in which it is located/positioned. Additionally, the processing in step 230 may involve converting a defined or chosen material for an object element or portion to a material that can be provided by the 3D printer or its current set or combination of materials (e.g., filaments on loaded spools for multiple heads or that can be switched out during printing). For example, the ID element may call for a material with a density that differs from that of the base printing material by a particular minimum amount, and a material may be chosen from one of the feed spools that meets this requirement. These different materials may then be mapped onto the differing regions or areas of the object layers.

The method 200 continues at 240 with determining (e.g., with the printing software running on the 3D printer) whether there are additional layers to be printed. If so, the method 200 continues at 250 with retrieving the next layer definition including ID element maps/definitions. At 254, the method 200 continues with drawing additional amounts of the object-forming material (plastic filament or the like) and ID element-forming material(s) into the print head or into two or more print heads such as by operating an electric motor to turn gears engaging the filament provided on two or more spools. At 260, the method 200 continues with heating the print material such as ABS plastic to liquefy it.

At step 280, the method 200 includes extruding the now liquid print material onto the print bed or previously-printed layer while positioning the extrusion nozzle relative to the print bed to print the current object layer. Once a layer, which may include a layer of an ID element integrally formed with a layer of an object element, is completed, the method 200 continues at 240 with determining whether or not more layers need to be printed. If so, the method 200 involves raising the extrusion nozzle vertically away from the print bed to a new layer height/vertical position and repeating steps 250-280. If not, the method 200 ends at 290 such as with moving the print head away from the printed 3D object with an embedded/integral ID element, turning the nozzle heater off, and indicating printing is completed (e.g., through a user interface on a printer interface computer system).

Figure 3:
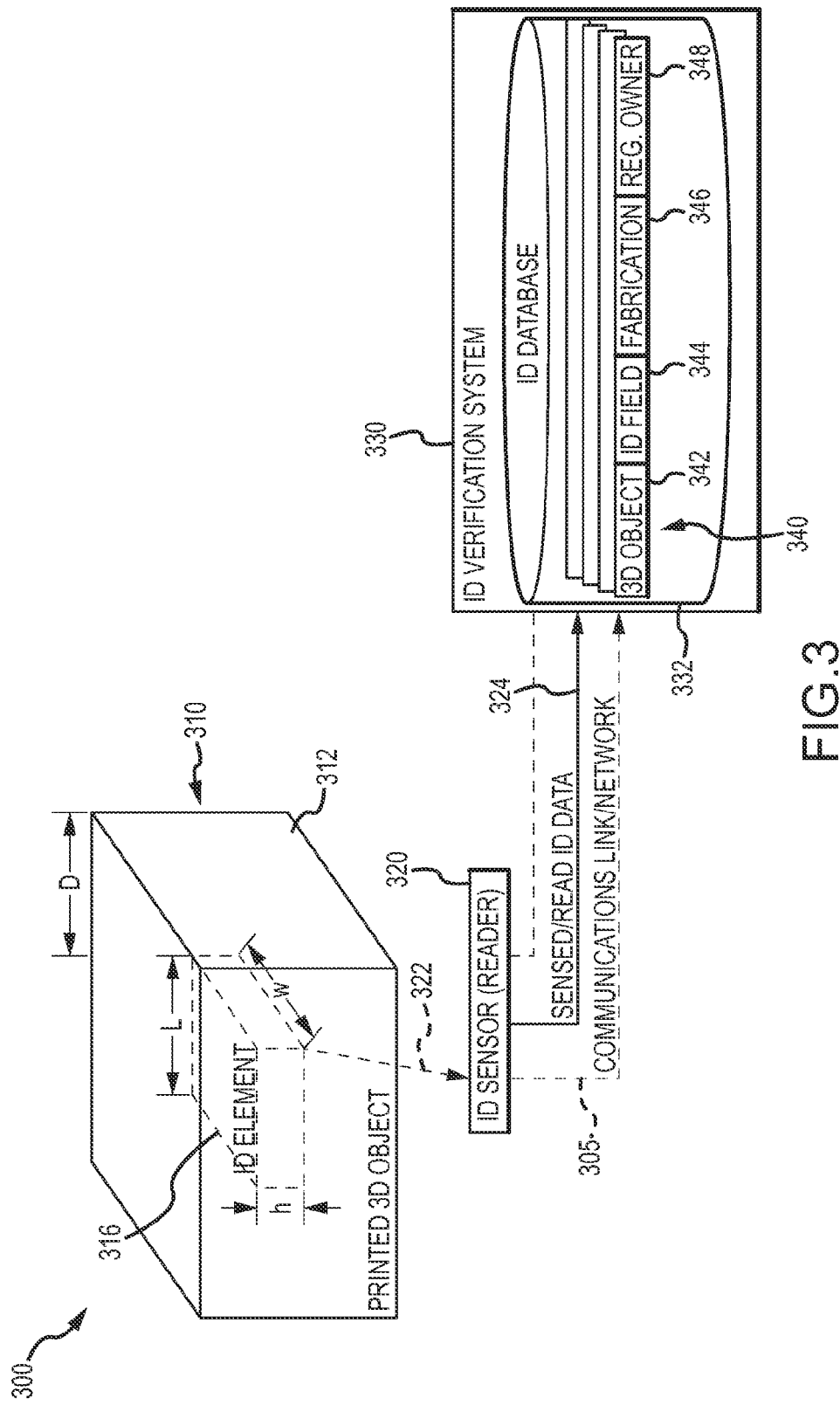
FIG. 3 is a functional block diagram of an object authentication or validation system useful with 3D objects printed as described herein to include an embedded or integrally-formed ID element or unique identifier.

FIG. 3 is a functional block diagram of an object authentication or validation system useful with 3D objects printed as described herein to include an embedded or integrally-formed ID element or unique identifier. As shown, the system 300 is being operated to determine whether a 3D object 310 is authentic or an original or whether it is a copy (i.e., does not include a verifiable ID element). The 3D object 310, in this example, is a 3D object that is printed or fabricated according to the present description with a 3D printer using a digital file that defines an ID element.

As a result as shown, the 3D object 310 includes an ID element 316 that is embedded within and integrally formed with the 3D object (e.g., it is printed by a 3D printer layer-by-layer with its outer surfaces bonded to nearby portions of the 3D object or its object elements). The ID element is a 3D object itself with a length, l, a width, w, and a height, h, and the pattern or shape and size of the ID element may provide unique identification data (e.g., matching information in an ID field 344 of a record 340 in an ID database 332) in some cases. In some cases, the location of the ID element within the object 310 may also be used in validating the authenticity of the object 310, with the example ID element 316 being embedded within the printed 3D object 310 as shown by the element 316 being at an offset or depth, d, within the object (as measured from a sidewall/shell 312 of the 3D object to a surface of the ID element 316).

By embedding the ID element 316, the risk of the 1D element being scanned and readily copied with a 3D printer is significantly reduced. The ID element 316 may be formed wholly of or at least partially with a material that differs from the adjacent material of the object 310 (such as in the sidewalls/shell 312) to allow sensing of the presence of the ID element 316 within the printed 3D object, e.g., a material with a differing (e.g., greater) density, a material that better (or differently) conducts electricity, or the like. In other cases, the ID element 316 takes the form of a passive RFID tag that can be read by an ID sensor 320.

The system 300 includes an ID sensor (or reader) 320 that operates to scan the 3D object 310 to sense the presence of the ID element 316 as shown at 322. The system 300 also includes an ID verification system 330, which includes one or more processors running/executing software (not shown) to perform the functions described herein and one or more data storage/memory devices storing an ID database(s) 332. The ID verification system 330 is communicatively linked as shown at 305 in a wired or wireless manner such as with a digital communications link (e.g., an Internet-based link or the like).

The ID sensor 320 transmits sensed or read ID data 324 that it obtains 322 from the ID element 316 to the ID verification system 330 to allow the authenticity or origin of the 3D object to be verified by the ID verification system 330. Particularly, the ID verification system 330 uses the sensed/read ID data 324 it receives to perform a lookup in the ID database 332, and this lookup may include finding a record 340 that has an ID field 344 that matches all or a portion of the sensed/read ID data (e.g., a serial or code number may be provided in data from an RFID tag). If a matching ID field 344 is found, the ID element 316 is validated/authenticated (sometimes a location within the object 310 is also required as a second check on ID elements 316 that have a matching ID field value).

The ID verification system 330 may respond by providing a validation response to a requestor, e.g., to a user device (not shown in FIG. 3) transmitting the sensed/read ID data. The validation response may indicate whether a matching record has been found in the ID database or not. If so, the validation response may include a name or information from a 3D object field 342 as well as the manufacturer or fabricator (or operator of a 3D printer) that printed the original/authentic 3D object 310 from field 346 in the matching record 340. Further, the validation response may include information (e.g., contact information) for a present or registered owner of the 3D object 310. In other cases, a requesting party may access the ID verification system to find registered owners (as identified in field 348) for a particular collectible/3D object, and these owners may be all the registered owners 348 of 3D objects that have a name/title provided in field 342 that matches the request. Then, the system 300 may use an ID sensor 320 to validate or authenticate a particular 3D object 310 presented by one of these owners from field 348 prior to or after a purchase of the collectible/object 310, whereby selling or transfer of copies of 3D objects without proper ID elements 316 can be reduced or prevented.

Figure 4:
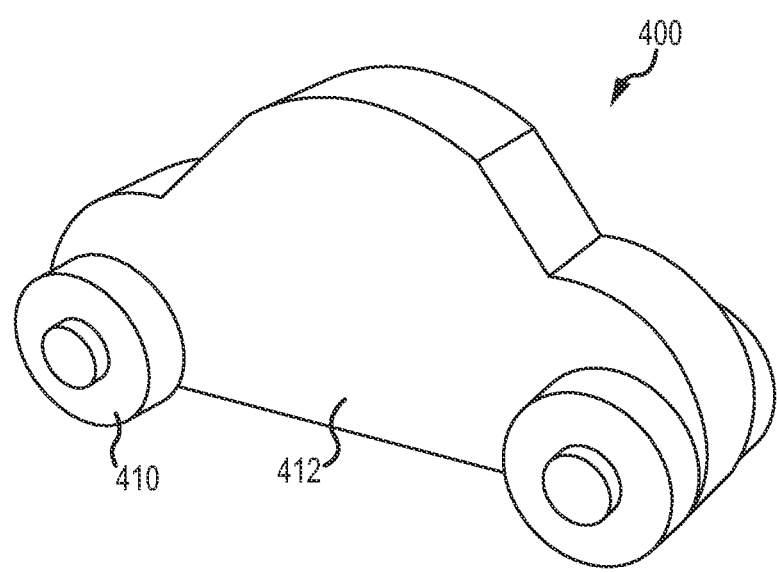
FIG. 4 is a perspective side view of a printed 3D object of the present description.

FIG. 4 is a perspective side view of a printed 3D object 400 of the present description. The 3D object 400 may be printed with the printing system 100 of FIG. 1 so as to include an integrally formed identifier (not shown in FIG. 4 as it is embedded). The object 400 in this example takes the form of a car with object elements 410 (wheels and a body), and each of these object elements may include or be defined by an outer sidewall or shell.

Figures 5A, 5B:
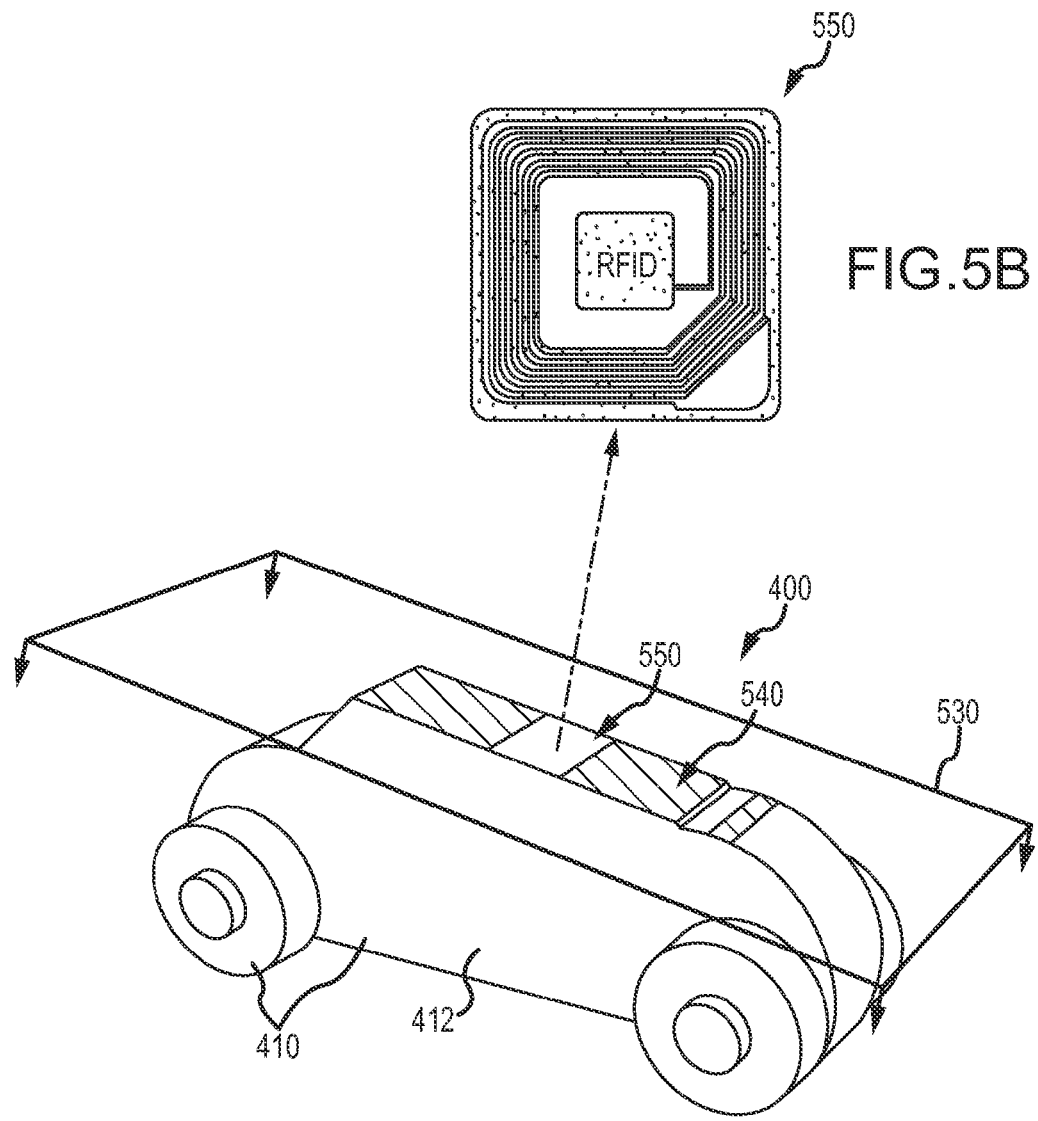
FIG. 5A is a sectional perspective view of the printed 3D object of FIG. 4 with an upper section removed revealing an interior portion of the object that includes an ID element.
FIG. 5B is an enlarged view of the ID element exposed in the view of FIG. 5A in the printed 3D object.

FIG. 5A is a sectional perspective view of the printed 3D object 400 of FIG. 4. As shown, an upper section of the 3D object 400 has been removed revealing an interior portion 540 of the object 400 that includes an ID element 550. FIG. 5B illustrates an enlarged view of the ID element 550, and it can be seen that in this embodiment the ID element 550 has a pattern that when printed (with proper materials, in some cases) with a 3D printer functions as a passive RFID tag. The RFID tag 550 may be configured such that when activated or read by an external reader it transmits ID data, and the ID data may include a serial or code number that acts to identify the ID element 550 (e.g., based on a record lookup in an ID database) and, hence, to also identify the 3D object 400 in which it has been formed. As shown in FIG. 5A, the ID element 550 embedded within the 3D object 400 as it is wholly enclosed within (or with only an outer edge defined in or by) outer sidewalls or shell 412 of the object 400. In this way, the ID element 550 cannot be effectively copied using a scan of external surfaces of the shell/sidewall 412, which makes it difficult to make copies of the object 400 without the digital file used in its printing that defines the ID element 550.

Figure 6:
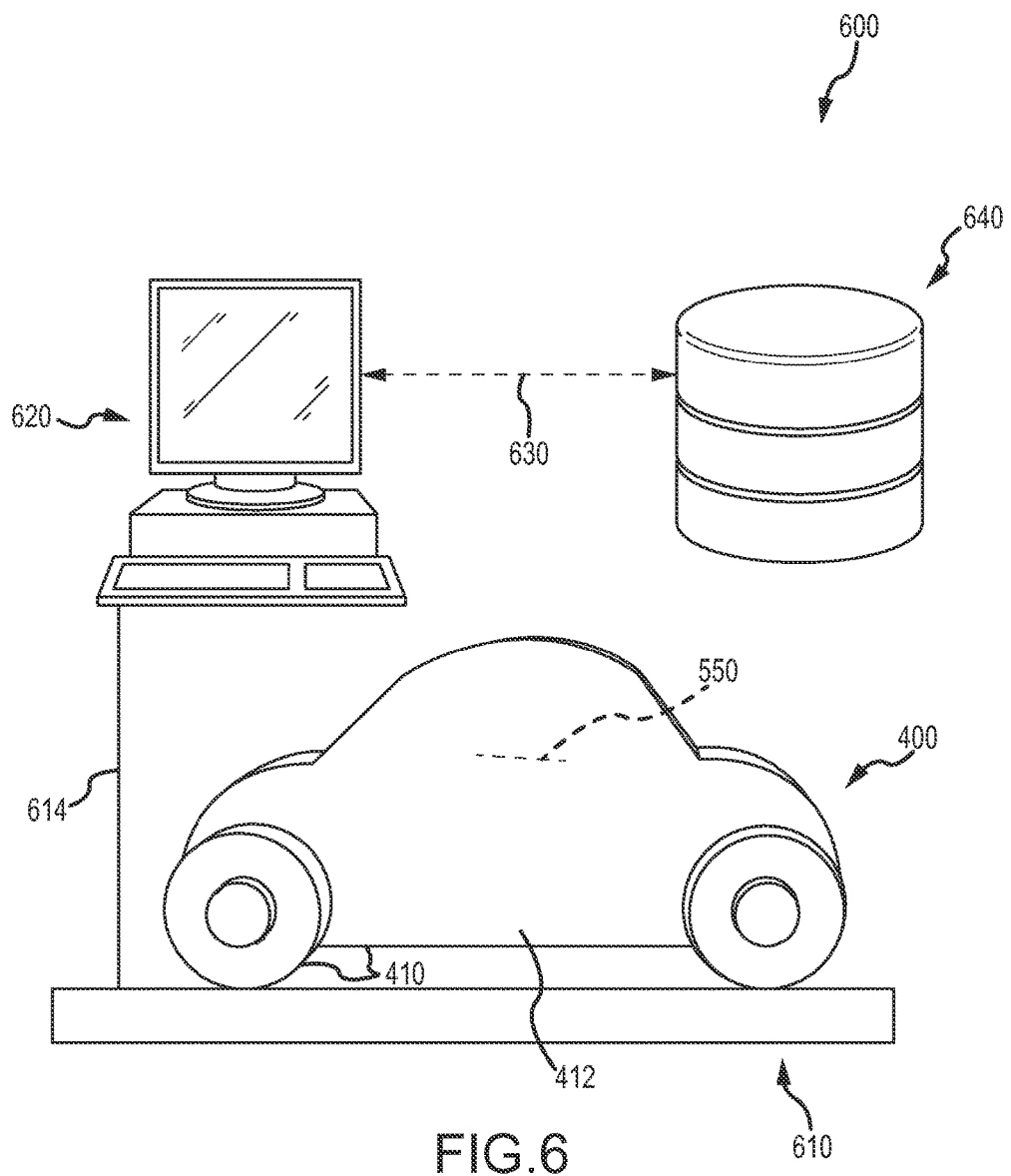
FIG. 6 illustrates a printed 3D object authentication (or validation) system that may be used to verify the 3D object of FIGS. 5A and 5B includes a readable and verifiable ID element (e.g., to verify the 3D object was printed with a 3D printer in an authorized or licensed manner).

FIG. 6 illustrates a printed 3D object authentication (or validation) system 600 that may be used to verify the 3D object 400 of FIGS. 4-5B includes a readable and verifiable ID element 550 (e.g., to verify the 3D object was printed with a 3D printer in an authorized or licensed manner). As shown, the system 600 includes an RFID reader or scanner 610, and the printed 3D object 400 with its embedded ID element 550 is placed on or in a useful vicinity of the RFID scanner/reader 610. The scanner/reader 610 is operated to ping the ID element 550, which is a passive RFID tag, which causes the RFID tag 550 to transmit data including in some cases a unique identification number or code to the RFID scanner 610.

The RFID scanner 610 processes this ID element-provided data and communicates it (or a portion of the sensed/read ID element data) to a user computer 620 via a communication link (e.g., a digital wired or wireless or network-based link 614). The user computer 620 includes software for processing the ID data from the RFID scanner 610 and, in response, to generate a validation or authentication request that it sends over communications link 630 (e.g., the Internet or other network) to a database 640 (or a server on network/link 630 that manages the database 640 including responding to validation requests from user devices 620). The database 640 performs a lookup using the ID element data from RFID scanner 610 and user computer 620 to determine whether it matches ID data in the database 640 (e.g., ID data from ID element 550 matches previously stored ID element data in database 640 that is associated with a particular 3D object 400). If a match is found, the object 400 is authenticated as an original or authentic version of a 3D model, and the results of the validation may be transmitted over link 630 to the user computer 620.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The 3D printer may be designed to build upon the Fused Filament Fabrication (FFF) method. Particularly, a 3D design of an object, including full ID element definitions, which can be used to print liquefied plastic, conductive materials, and/or other materials to provide both the object elements and the integrally formed ID element (or unique identifier). The controller and/or software of the 3D printer translate the 3D design into instructions for the 3D printer. The 3D printer then heats the two or more filaments or other print material sources and extrudes it out through nozzles on a surface to build a 3D object layer-by-layer (with the surface optionally being heated to control cooling and subsequent shrinking of lower layers), including the differing materials for the ID element and/or the differing pattern of the ID element (e.g., when the ID element is an RFID tag or the like). The object-forming filament(s) and ID element-forming filament(s) may be fed to the print head or print heads (e.g., into the print heads' extruders) via guide tubes in some embodiments of the 3D printer.

We claim:

1. A method of operating a three dimensional (3D) printer to print an object that is difficult to copy, comprising:

providing a digital file defining a 3D model of an object to the 3D printer, wherein the 3D model includes a model of an identification (ID) element and wherein the ID element is positioned at a predefined location in the 3D model;

processing the digital file to define a plurality of print layers of the 3D model, wherein a number of the print layers include layers of the model of the ID element; and operating the 3D printer to sequentially print the print layers to form a 3D object with an integrally formed ID element at a location corresponding with the predefined location in the 3D model, wherein the 3D object has an outer shell with an outer surface, wherein the integrally formed ID element is positioned within an interior space enclosed by the outer shell, and wherein the integrally formed ID element is spaced apart a distance from the outer surface.

2. The method of claim 1, wherein the integrally formed ID element comprises a radio frequency ID (RFID) tag.

3. The method of claim 2, wherein the RFID tag is a passive RFID tag configured to transmit identification data when scanned or read by an RFID reader.

4. The method of claim 1, wherein the operating of the 3D printer to sequentially print the print layers comprises printing portions of the 3D object with a first print material and the integrally formed ID element with a second print material that differs from the first print material with regard to at least one physical characteristic.

5. A product formed using the method of claim 4.

6. The method of claim 4, wherein the physical characteristic is density.

7. The method of claim 6, wherein the integrally formed ID element has a greater density than the portions of the 3D object printed with the first print material.

8. The method of claim 4, wherein the physical characteristic is electrical conductivity and wherein the integrally formed ID element is more electrically conductive than the portions of the 3D object printed with the first print material.

9. A printed 3D object adapted to be difficult to copy, comprising:
an outer shell comprising a plurality of print layers formed using a first print material;
an interior portion providing infill of a void space within the outer shell; and
an ID element integrally formed with the interior portion providing the infill of the void space,
wherein the ID element is positioned at a location within the void space and is spaced apart from the outer shell, and
wherein the location of the ID element corresponds with a predefined location in a 3D model of the printed 3D object defined by a digital print file or corresponds with location data in ID records of a validity database.

10. The printed 3D object of claim 9, wherein the integrally formed ID element comprises a radio frequency ID (RFID) tag.

11. The printed 3D object of claim 10, wherein the RFID tag is a passive RFID tag configured to transmit identification data when scanned or read by an RFID reader.

12. The printed 3D object of claim 9, wherein the integrally formed ID element comprises a plurality of print layers formed of a second print material that differs from the first print material with regard to at least one physical characteristic.

13. The printed 3D object of claim 12, wherein the physical characteristic is density and the integrally formed ID element has a greater density than the portions of the 3D object printed with the first print material.

14. The printed 3D object of claim 12, wherein the physical characteristic is electrical conductivity and wherein the integrally formed ID element is more electrically conductive than the portions of the 3D object printed with the first print material.

15. The printed 3D object of claim 9, wherein the ID element is not visible on any exterior surface of the outer shell during scanning of exterior surfaces of the outer shell.

16. A method of validating authenticity of printed 3D objects, comprising:
receiving a validation query, from a user device, comprising ID data for a printed 3D object, wherein the ID data comprises data gathered by an ID sensor sensing an ID element of the printed 3D object and wherein the ID element is enclosed by an outer shell of the printed 3D object;
searching ID records of a database for a match to the ID data, wherein the ID records include unique identifiers for a plurality of objects previously authorized for fabrication with 3D printing; and
when the ID data is matched in the searching step to one of the ID records, generating a response to the validation query that includes a validation of the printed 3D object as an authentic printed object,
wherein the ID data includes a location of the ID element in the printed 3D object, and
wherein the searching ID records further includes comparing location data in the ID records for a match to the location in the ID data.

17. The method of claim 16, wherein the ID element comprises a passive RFID tag embedded in the printed 3D object, wherein the ID sensor comprises an RFID scanner, and wherein the ID data comprises a serial number or code corresponding with one of the unique identifiers.

18. The method of claim 16, wherein the ID element comprises a 3D item formed integrally with the printed 3D object and wherein the 3D item is formed of a first material with a density or electrical conductivity greater than a second material used to print other portions of the printed 3D object.

19. The method of claim 16, further comprising receiving a print request from an additional user device to print an additional 3D object, responding to the print request by inserting a new ID record in the database with an additional one of the unique identifiers and by transmitting a print authorization to the additional user device including the additional one of the unique identifiers for use in defining an ID element to include in or on the additional 3D object.

* * * * *